United States Patent [19]

Moggi et al.

[11] Patent Number: 5,202,372
[45] Date of Patent: Apr. 13, 1993

[54] CURABLE COMPOSITIONS BASED ON FLUOROELASTOMERS VULCANIZABLE WITH PEROXIDES

[75] Inventors: Giovanni Moggi, Milan; Gianna Cirillo, Genoa; Alberto Fontana, Milan; Silvana Modena, Monza; Raffaele Ferro, Milan, all of Italy

[73] Assignee: Ausimont S.p.A, Milan, Italy

[21] Appl. No.: 890,376

[22] Filed: May 26, 1992

Related U.S. Application Data

[63] Continuation of Ser. No. 342,621, Apr. 24, 1989, abandoned, which is a continuation of Ser. No. 67,155, Jun. 29, 1987, abandoned.

[30] Foreign Application Priority Data

Jun. 30, 1986 [IT] Italy .................... 20973 A/86

[51] Int. Cl.$^5$ ............ C08K 5/02; C08L 15/02; C08L 27/12
[52] U.S. Cl. .................. 524/462; 525/199; 525/359.5; 526/149; 526/254
[58] Field of Search ........... 524/462; 525/199, 359.5; 526/149, 254

[56] References Cited

U.S. PATENT DOCUMENTS

| | | |
|---|---|---|
| 2,820,772 | 1/1958 | Barnhart ............... 524/462 |
| 2,875,253 | 2/1959 | Barnhart ............... 524/462 |
| 2,975,220 | 3/1961 | Hauptschein et al. ........ 260/408 |
| 3,046,304 | 7/1962 | Haszeldine ............ 524/462 |
| 3,051,677 | 8/1962 | Rexford et al. ......... 526/254 |
| 3,083,238 | 3/1963 | Hauptschein et al. ........ 524/462 |
| 3,318,854 | 5/1967 | Honn et al. ............ 526/249 |
| 3,345,424 | 10/1967 | Hauptschein et al. ........ 570/218 |
| 3,531,432 | 9/1970 | Graver ................ 525/199 |
| 3,712,877 | 1/1973 | Patel et al. ............ 260/87.7 |
| 3,956,000 | 5/1976 | Kuhls et al. ........... 524/462 |
| 4,115,481 | 9/1978 | Finlay et al. .......... 525/199 |
| 4,243,770 | 1/1981 | Tatemoto et al. ........ 525/326.3 |
| 4,251,399 | 2/1981 | Tomoda et al. ......... 525/199 |
| 4,260,698 | 4/1981 | Tatemoto et al. ........ 525/199 |
| 4,487,882 | 12/1984 | Ueta et al. ............ 524/451 |
| 4,530,970 | 7/1985 | Morozumi et al. ........ 525/199 |
| 4,564,662 | 1/1986 | Albin ................. 525/326.3 |
| 4,810,765 | 3/1989 | Modena et al. ......... 526/249 |

FOREIGN PATENT DOCUMENTS

| | | |
|---|---|---|
| 0131203 | 1/1985 | European Pat. Off. . |
| 171290 | 2/1986 | European Pat. Off. ....... 525/276 |
| 60-203613 | 10/1985 | Japan . |
| 2031913 | 4/1980 | United Kingdom ......... 525/199 |

OTHER PUBLICATIONS

Conroy et al., in "Rubber Age", vol. 76, 543-550 (1955).

Primary Examiner—Paul R. Michl
Assistant Examiner—Tae H. Yoon
Attorney, Agent, or Firm—Stevens, Davis, Miller & Mosher

[57] ABSTRACT

Fluoroelastomeric compositions peroxy-curable, endowed with improved characteristics of processability and compatibility, and with enhanced low-temperature properties, comprising, as additives, vinylidene fluoride cotelomers having the general formula:

$$R[(CH_2CF_2)_n(C_3F_6)_m(C_2F_4)_p(C_2F_3Cl)_q]X \qquad (I)$$

wherein:
X=Br, I;
R is a possible halogenated alkyl radical;
n, m, p, q are integers, m, p, q may also be zero.

5 Claims, No Drawings

CURABLE COMPOSITIONS BASED ON FLUOROELASTOMERS VULCANIZABLE WITH PEROXIDES

This application is a continuation of application of Ser. No. 342,621, filed Apr. 24, 1989, now abandoned, which in turn is a continuation application of application Ser. No. 067,155, filed Jun. 29, 1987, now abandoned.

FIELD OF THE INVENTION

The present invention relates to the use of vinylidene fluoride telomers and cotelomers containing at least one end bromine or iodine atom, as additives for fluoroelastomeric compositions vulcanizable with peroxides or with mixed peroxide and ionic curing systems.

BACKGROUND OF THE INVENTION

In fluoroelastomeric compositions the use of coadjuvants is necessary because of the poor characteristics of extrudability of the compounds, of the phenomena of adhesion to the molds, and of fouling thereof.

In the fluoroelastomeric compositions of the prior art, as plasticizers or lubricant products use was made of the following types: vegetable waxes, low-molecular-weight polyethylene, miscellaneous stearates, polyesters, octadecylamine and so forth.

The processing coadjuvants of the prior art cause, in some cases, problems of interference with the peroxidic vulcanization system, and problems of poor surface appearance of the molded article. Furthermore, in the specific case of fluoroelastomers, for the purpose of endowing them with the well-known properties of heat resistance and resistance to chemical agents and solvents, a "thermal stabilization" (post-cure) at a temperature of from 200° to 250° C. for a time of from 10 to 30 hours is essential. During this step, the common plasticizers (polyglycols, stearates, organic phosphates, oleates, phthalates, etc.) volatilize and/or decompose.

This causes a considerable deterioration of the mechanical properties of the finished articles; in particular:
excessive increase in hardness;
decrease of compression set;
decrease of the elastic characteristics (low elongation and high modulus value)
poor heat resistance, which prevents the articles from being used under severe application conditions (T>180° C.).

Summing up, the benefits obtained during the processing step correspond to unacceptable drawbacks in the finished articles.

As a consequence, the use of plasticizers or lubricating agents is limited to low amounts (1-2 p.h.r.), which do not sensibly affect the end properties of the cured articles, but which are, on the other hand, insufficient for fulfilling the above requirements.

It was observed, in particular, that the use of perfluorosiliconic oils allows the hardness to be reduced by 4-5 points; it shows, however, difficulties for the blending and incorporation of said oils into the fluoroelastomer, due to the mutual incompatibility of the two polymeric systems. Furthermore, a lowering in curing rate and a deterioration of compression set value and of thermal resistance are observed.

The use is known as well of low-molecular-weight fluorinated copolymers of vinylidene fluoride, eventually in combination with the above indicated plasticizers, to endow the compounds with lower Mooney viscosity values, and better rheological characteristics during the processing and fabricating steps (see Du Pont's Viton ®).

However, such a type of plasticizers can only be used with curing system having ionic mechanisms and which use diaminic or bisphenolic derivatives, in the presence of an accelerating agent (U.S. Pat. No. 3,712,877 by 3M).

By this curing system, the plasticizer polymer having low-molecular-weight is bonded to the fluoroelastomer during the vulcanization process.

On the contrary, no chemical bonds with the same plasticizer (type VITON ® LM) are formed (*), if the fluoroelastomers are formulated for curing with peroxidic systems. From this, there results a worsening in the characteristics of stability to acids, to steam and to heat, in polar solvents and to SF-type formulated oils, such as BP olex, characteristics which are typically required in fluoroelastomers vulcanized with peroxides. (*) see VITON data sheet VT 240 LM (R1).

THE PRESENT INVENTION

It has, surprisingly, been found that by using telomers and cotelomers within general formula:

$$R[(CH_2CF_2)_n(C_3F_6)_m(C_2F_4)_p(C_2F_3Cl)_q]X \qquad (I)$$

wherein X is either Br or I; the units with n, m, p, q indices are randomly distributed along the telomer chain, R is a linear or branched $C_1$–$C_{20}$ alkyl radical, which can also contain halogen atoms, and, eventually, ester or ether groups, and wherein:

n=integer of from 1 to 30;
m=integer of from 0 to 10;
p and q are integers within the range of from 0 to 20, as additives at amounts within the range of from 0.5 to 10 parts by weight per 100 parts of rubber (p.h.r.), and preferably of from 1 to 3 p.h.r., said additives having an average molecular weight preferably within the range of from 600 to 2,500, compounds were obtained which had the same formulation and the same agents (rubber, cross-linking agent, acid acceptors) of the prior art formulation, but showing a better behaviour both as to the processability, as evidenced by the observed lowering or minimum torque, as to the extrudability (Garvey test), as well as to the elastomechanical properties and the adhesion of the cured article to metal substrates.

By operating with suitable amounts of the additives of the present invention, these do not sensibly interfere with the curing system: in fact, vulcanization tests carried out according to ASTM D2084 Standard with Monsanto oscillating-disc rheometer, did not show any meaningful differences either as relates to the curing rate, or as to the curing yield.

An increase in cross-linking rates is observed on the contrary when the elastomeric matrix contains, besides the above menioned type of elastomers, also a further elastomer comprising hydrogen-containing olefin, such as tetrafluoroethylene/propylene copolymers (AFLAS ®) or the ethylene/propylene/diene terpolymer (EPDM).

In any case, a reduction in minimum torque—an index of better processability of the compounds—was evidenced.

Furthermore, the bromine-or iodine-containing additive forms a chemical bond with the elastomeric chain during the curing process.

In fact, by submitting the additive-containing compound to extraction tests by suitable solvents, the additive is recovered from the extraction liquid. On the contrary, when the additive-containing blend is cured, a subsequent extraction with the same solvent does not lead to the recovery of the additive from the liquid.

DETAILED DESCRIPTION OF THE INVENTION

The preparation of the additives of the present invention having the formula (I) can be carried out by telomerizing vinylidene fluoride either alone or in admixture with one or more of the fluorinated olefins represented by the above formula (I), in the presence of a free-radical polymerization initiator and of a telogen of general formula RX, wherein X is either Br or I and R is a radical of the type as indicated in the formula (I), at a temperature within the range of from 0° to 200° C. The telomerization is carried out in a liquid phase constituted by the telogen containing the monomers, in the presence or absence of an inert solvent.

Obviously, the telomeric product can actually be also constituted by a mixture of individual cotelomers having different n, m, p, q, indices. In the examples, the average values of these indices are reported.

The description of these cotelomers and telomers, wherein m+n+p is at least equal to 1, is disclosed in a copending Italian patent application No. 20972 A/86 filed concurrently herewith by the same assignee.

As useful telogens, there can be used: dibromodifluoromethane, 1-2-dibromotetrafluoroethane, trifluoromethyl iodide, bromotrichloromethane, 1-bromo-perfluorobutane, 2-bromo-propane, ter. butyl bromide.

As free-radical initiators, all those known from the art of free-radical polymerization, such as the peroxides and azo-compounds, are useful. Among the peroxides, in particular di-tert.butylperoxide, benzoylperoxide, dicumylperoxide, bis-peroxycarbamates and bis-peroxy-carbonates, and so forth, can be used.

The amount of free-radical initiator, relative to the sum of total fluorinated olefins, is within the range of from 0.01% to 10% by mol, preferably from 1% to 5%.

Particularly useful are the products having an average molecular weight within the range of from 600 to 2500.

The additives according to the present invention are used in amounts within the range of from 0.5 to 10 parts, and preferably 1-3 parts by weight, per each 100 parts of fluoroelastomer of the hereinunder indicated type.

These additives give to the fluoroelastomeric compositions the following characteristics:
- high processability, in particular as relates to the processing by extruder;
- improved low-temperature properties of the vulcanizate (low $T_g$);
- enhanced compatibility of the fluoroelastomers with non-fluorinated elastomers, with an improved vulcanization rate of such blends;
- improved elastomeric properties of the cured article;
- better thermal and chemical stability of the cured article.

As typical peroxy-curable fluoro-elastomers to be used in the present invention, there can be cited: $CH_2=CF_2/C_3F_6$, the vinylidene fluoride/hexafluoropropene/tetrafluoroethylene terpolymers containing peroxidic cure sites, the vinylidene fluoride/chlorotrifluoroethylene copolymers eventually containing tetrafluoroethylene, the fluorosilicone rubbers containing peroxidic cure sites, blends of rubbers, at least one of which is curable with peroxides or with mixed vulcanization systems, in particular blends of a fluoroelastomer based on $CH_2=CF_2$ and on an elastomeric $C_2F_4/C_3H_6$ copolymer type AFLAS ®, $C_2F_4$ with perfluoroalkylvinylether (Kalrez ®) and blends of a fluoroelastomer based on $CH_2=CF_2$ and an EPDM terpolymer.

As the ingredients for obtaining vulcanizable compositions of the above-said fluoroelastomers, those known in the art, such as those hereunder set forth, are used.

Peroxidic Curing Agent

This is an organic peroxide, such as, e.g.: benzoylperoxide, dicumylperoxide, 2,5-dimethyl-2,5-di-(ter.butyl-peroxy)-hexane, alpha, alpha'-bis-(ter.butylperoxy)-diisopropylbenzene, and aliphatic or cyclic bis-peroxycarbamates.

Vulcanization Co-agent

This is an unsaturated di-, tri- or polyfunctional compound, such as, e.g., triallylcyanurate, triallylisocyanurate, divinylbenzene, m-phenylene-bis-(maleic acid imide).

Reinforcing Agents

Carbon blacks, silica, etc.

Acidity acceptors

E.g.: lead, zinc, calcium, magnesium oxides.

The following Examples are supplied only for the purpose of illustrating the possibilities of application of the invention.

EXAMPLES 1-12

According to the usual blending techniques, rubber blends were prepared containing the ingredients shown in Tables 1, 2, 3. On the so-prepared compounds, the tests and measurements as indicated in Tables 1, 2, 3 were carried out.

Ingredients used in the blends

Elastomer 1

A terpolymer of $CH_2=CF_2/C_3F_6/C_2F_4$ in 2:1:1 molar ratio, containing as the cure site monomer a brominated olefin, having Mooney viscosity ML (1+4) at 100° C. = 104, and a total bromine content of 3,500 ppm (VITON ® GF).

Elastomer 2

A copolymer of $C_2F_4/C_3H_6$ in 1:1 molar ratio, having Mooney viscosity ML (1+4) at 100° C. = 130 (AFLAS ®).

Elastomer 3

A copolymer of $CH_2=CF_2/C_3F_6$ in 79/21 molar ratio, having Mooney viscosity ML (1+4) at 100° C. of 65, and containing 0.2% by weight of bromine, derived from end groups.

Luperco ® 101 XL 2,5-Dimethyl-2,5-di-(tert-1-butylperoxy)-hexane: product at 45% by weight, with 55% of inert fillers.

TAIC

Triallylisocyanurate.

MT Black

Carbon black for rubbers (ASTM N 990).

Accelerating Agent

1-Chloro-1-benzyl-1,1-diphenyl-N-diethyl-phosphoranamine.

Additive 1 (Telomer)

The additive is prepared by telomerizing vinylidene fluoride (VDF) in an autoclave in the presence of an equimolar amount of 1,2-dibromotetrafluoroethane ($CF_2Br-CF_2Br$), and of di-tert.butylperoxide, as the free-radical initiator, at 130° C. for 2 hours. The reaction mixture is cooled to room temperature and unreacted VDF and $CF_2Br-CF_2Br$, and the residues of the free-radical initiator are distilled off.

The telomer is analysed by $^{19}$F-N.M.R., and has the following structural formula:

$$CF_2Br-CF_2(CH_2CF_2)_nBr$$

with an n average value of 8.2.

The average molecular weight ($\overline{M}$), measured by osmometry, is 800, and the glass transition temperature ($T_g$) is $-90°$ C.

Additive 2 (VDF/$C_3F_6$ Cotelomer)

This product was prepared by cotelomerizing a mixture of VDF/$C_3F_6$ in 70/30 molar ratio in the presence of $CF_2Br-CF_2Br$ (20% by mol referring to the total of VDF and $C_3F_6$ olefins) and of di-tert.butylperoxide.

Its average formula, from $^{19}$F-N.M.R. analysis, is $CF_2Br-CF_2(VDF)_n(C_3F_6)_mBr$, with n/m=4.5, $M_n=2,200$ and $T_g=-60°$ C. The product is isolated as described for Additive 1; cotelomers of VDF with $C_3F_6$ can be prepared as disclosed in the aforesaid Italian patent application filed on the same day as the present application.

Additive 3 (VDF/TFE Cotelomer)

This additive is prepared by operating as disclosed for Additive 2, by cotelomerizing a mixture of VDF/$C_2F_4$ in 90/10 molar ratio in the presence of $CF_3(CF_2)_6Br$ (telogen agent), in an equimolar amount referring to olefins VDF and $C_2F_4$, at 130° C. for 1 hour in an autoclave. From the $^{19}$F-N.M.R. analysis, the cotelomer has an average formula $$CF_3(CF_2)_6(VDF)_n(TFE)_pBr$$

with an n/p ratio of 7.1, and an average molecular weight, by osmometry, of 2,100.

EXAMPLE 13

A blend is formulated as shown in Table 1, Example 3. A portion of the blend is then treated with 1,2,2-trichlorotrifluoroethane (FC 113) for 2 hours at room temperature. The extract is purified from the existing solid particles, and is submitted to I.R. and N.M.R. analyses. The spectra indicate that the product is Additive 1.

Another portion of the blend is press-cured at 170° C. for 10 minutes, and post-cured in an oven for 16 hours at 250° C.

After cooling, a portion of the cured fluoroelastomer composition is treated with FC 113 for 2 hours at room temperature. Practically no compound is extracted; which demonstrates that Additive 1 formed a chemical bond with the rubber during the curing process.

TABLE 1

| EXAMPLE | | 1 | 2 | 3 | 4 | 5 |
|---|---|---|---|---|---|---|
| ELASTOMER 1 | parts by weight | 100 | 100 | 100 | 100 | 100 |
| ADDITIVE 1 | parts by weight | — | 1 | 2 | — | — |
| ADDITIVE 2 | parts by weight | — | — | — | 1 | 2 |
| LUPERCO XL 101 | parts by weight | 3 | 3 | 3 | 3 | 3 |
| TAIC | parts by weight | 3 | 3 | 3 | 3 | 3 |
| PbO | parts by weight | 3 | 3 | 3 | 3 | 3 |
| MT BLACK | parts by weight | 30 | 30 | 30 | 30 | 30 |
| THERMOMECHANICAL CHARACTERISTICS | | | | | | |
| ODR at 180° C. (1) | | | | | | |
| Min. Torque, (inch · pounds) | | 23 | 20.5 | 19 | 20 | 18.5 |
| ts 10 (minutes) | | 1 min 6 sec | 1 min 6 sec | 1 min 10 sec | 1 min 8 sec | 1 min 11 sec |
| ts 50 (minutes) | | 2 minutes | 2 min 13 sec | 2 min 18 sec | 2 min 15 sec | 2 min 20 sec |
| Max. Torque (inch · pounds) | | 104 | 92 | 88 | 98 | 94 |
| MOONEY VISCOSITY MS at 135° C. (2) | | | | | | |
| Minimum Value | | 39 | 36 | 34 | 35 | 33 |
| Minutes for an increase of 15 points (t15) | | 12 min 30 sec | 13 min 10 sec | 13 min 30 sec | 13 min 30 sec | 14 minutes |
| VULCANIZATION | | | | | | |
| Press 170° C. × 10 minutes | | | | | | |
| Oven 250° C. × 10 hours | | | | | | |
| Modulus at 100% (MPa) (3) | | 6.5 | 5.5 | 5.0 | 5.4 | 5.1 |
| Tensile Strength (MPa) (3) | | 20.0 | 18.5 | 18.0 | 18.7 | 17.8 |
| Elongation at Break (%) (3) | | 214 | 231 | 240 | 230 | 245 |
| IRHD Hardness (4) | | 74 | 73 | 72 | 72 | 71 |
| CURED ARTICLE | | | | | | |
| Processability (5) | | | | | | |
| Flow Rate (a) (g/minute) | | 30 | 32 | 35 | 33 | 36 |
| Garvey Rating (b) | | 6 | 8 | 9 | 8 | 9 |
| LOW-TEMPERATURE CHARACTERISTICS | | | | | | |

TABLE 1-continued

| EXAMPLE | 1 | 2 | 3 | 4 | 5 |
|---|---|---|---|---|---|
| Brittle point (°C.) (6) | −35/−40 | −37/−42 | −39/−44 | −37/−42 | −40/−45 |

(1) According to ASTM D-2084
(2) According to ASTM D-1646
(3) According to ASTM D-412
(4) According to ASTM D-1415 on 6-mm thick specimens
(5) According to ASTM D-2230-78 (a) Method B, (b) Method A System B
(6) According to ASTM D-746

TABLE 2

| EXAMPLE | | 6 | 7 | 8 | 9 |
|---|---|---|---|---|---|
| ELASTOMER 1 | parts by weight | 70 | 70 | 70 | 70 |
| ELASTOMER 2 (AFLAS) | parts by weight | 30 | 30 | 30 | 30 |
| ADDITIVE 3 | parts by weight | — | 1 | 2 | 3 |
| LUPERCO XL 101 | parts by weight | 3 | 3 | 3 | 3 |
| TAIC | parts by weight | 3 | 3 | 3 | 3 |
| PbO | parts by weight | 3 | 3 | 3 | 3 |
| MT BLACK | parts by weight | 30 | 30 | 30 | 30 |
| THERMOMECHANICAL CHARACTERISTICS | | | | | |
| ODR at 180° C. (1) | | | | | |
| Min. Torque, (inch · pounds) | | 20 | 18 | 17 | 16 |
| ts 10 (minutes) | | 1 min 7 sec | 1 min 12 sec | 1 min 18 sec | 1 min 20 sec |
| ts 50 (minutes) | | 2 min 16 sec | 2 min 36 sec | 2 min 42 sec | 2 min 46 sec |
| Max. Torque (inch · pounds) | | 95 | 87 | 85 | 83 |
| MOONEY VISCOSITY MS at 135° C. (2) | | | | | |
| Minimum Value | | 36 | 34 | 33 | 32 |
| Minutes for an increase of 15 points (t15) | | 18 min 15 sec | 19 min 25 sec | 19 min 40 sec | 20 minutes |
| VULCANIZATION | | | | | |
| Press 170° C. × 10 minutes | | | | | |
| Oven 250° C. × 10 hours | | | | | |
| Modulus at 100% (MPa) (3) | | 6.8 | 6.0 | 6.0 | 5.9 |
| Tensile Strength (MPa) (3) | | 201 | 204 | 200 | 190 |
| Elongation at Break (%) (3) | | 220 | 250 | 240 | 250 |
| IRHD Hardness (4) | | 73 | 72 | 71 | 70 |
| Compression Set, O-Ring (0 25.4 × 3.53 mm) at 200° C. × 70 hours (5) | | 42 | 39 | 36 | 37 |
| PROCESSABILITY (6) | | | | | |
| Flow Rate (a) (g/minute) | | 30 | 32 | 36 | 36 |
| Garvey Rating (b) | | 8 | 10 | 11 | 12 |

(1) According to ASTM D-2084
(2) According to ASTM D-1646
(3) According to ASTM D-412
(4) According to ASTM D-1415 on 6-mm thick specimens
(5) According to ASTM D-395 Method B
(6) According to ASTM D-2230-78 (a) Method B, (b) Method A System B

TABLE 3

| EXAMPLE | | 10 | 11 | 12 |
|---|---|---|---|---|
| ELASTOMER 3 | parts by weight | 70 | 70 | 70 |
| ELASTOMER 2 (AFLAS) | parts by weight | 30 | 30 | 30 |
| ADDITIVE 2 | parts by weight | — | 1.5 | — |
| ADDITIVE 3 | parts by weight | — | — | 1.5 |
| BISPHENOL AF | parts by weight | 1.1 | 1.1 | 1.1 |
| ACCELERATOR | parts by weight | 0.5 | 0.5 | 0.5 |
| LUPERCO XL 101 | parts by weight | 2 | 2 | 2 |
| TAIC | parts by weight | 2 | 2 | 2 |
| CARNAUBA | parts by weight | 1 | 1 | 1 |
| THERMOMECHANICAL CHARACTERISTICS | | | | |
| ODR at 180° C. (1) | | | | |
| Min. Torque, (inch · pounds) | | 14 | 12 | 12 |
| ts 10 (minutes) | | 1 min 33 sec | 1 min 45 sec | 1 min 50 sec |
| ts 50 (minutes) | | 3 min 45 sec | 4 min 30 sec | 7 min 42 sec |
| Max. Torque (inch · pounds) | | 120 | 113 | 89 |
| MOONEY VISCOSITY MS at 135° C. (2) | | | | |
| Minimum Value | | 26 | 23 | 23 |
| Minutes for an increase of 15 points (t15) | | 15 min 15 sec | 18 min 15 sec | 24 minutes |
| VULCANIZATION | | | | |
| Press 170° C. × 10 minutes | | | | |
| Oven 250° C. × 10 hours | | | | |
| Modulus at 100% (MPa) (3) | | 7.6 | 7.5 | 7.2 |
| Tensile Strength (MPa) (3) | | 15.5 | 16.5 | 17.0 |
| Elongation at Break (%) (3) | | 175 | 195 | 200 |
| IRHD Hardness (4) | | 75 | 75 | 76 |

TABLE 3-continued

| EXAMPLE | 10 | 11 | 12 |
|---|---|---|---|
| PROCESSABILITY (6) | | | |
| Flow Rate (a) (g/minute) | 31 | 33 | 35 |
| Garvey Rating (b) | 11 | 13 | 14 |

(1) According to ASTM D-2084
(2) According to ASTM D-1646
(3) According to ASTM D-412
(4) According to ASTM D-1415 on 6-mm thick specimens
(5) According to ASTM D-395 Method B
(6) According to ASTM D-2230-78 (a) Method B, (b) Method A System B

What we claim is:

1. Cured fluoroelastomeric compositions obtained by curing fluoroelastomers containing peroxide cure sites with peroxides or with mixed peroxidic and ionic curing systems, said compositions comprising additives, in amounts within the range of from 0.5 to 10 parts by weight per 100 parts by weight of fluoroelastomer, said additive having the formula:

$$R-[(CH_2CF_2)_n-(C_3F_6)_m-(C_2F_4)_p-(C_2F_3Cl)_q]-X \quad (I)$$

wherein:
X is either Br or I; the units with n, m, p, q indices are randomly distributed along the telomer chain, R is a linear or branched $C_1-C_{20}$ alkyl radical, which may also contain halogen atoms or ester or ether groups, and wherein:
n = an integer from 1 to 30;
m = an integer of from 0 to 10;
p and q are integers within the range of from 0 to 20, said additives having an average molecular weight within the range of from 600 to 2,500.

2. The fluoroelastomeric compositions cured with peroxides according to claim 1, wherein the additive is used in amounts within the range of from 1 to 3 parts by weight per 100 parts by weight of fluoroelastomer.

3. The cured fluoroelastomeric compositions according to claim 1, wherein the elastomer is selected from the following copolymers:
a) fluoroelastomeric copolymers of $CH_2=CF_2$ with $C_3F_6$, or copolymers of $CH_2=CF_2$ with $C_3F_6$ and $C_2F_4$;
b) fluoroelastomeric copolymers of $CH_2=CF_2$ with chlorotrifluoroethylene, or copolymers of chlorotrifluoroethylene and $C_2F_4$;
c) fluoroelastomeric terpolymers of $C_3F_6$, $CH_2=CF_2$ and perfluoroalkylvinylether;
d) fluoroelastomeric copolymers of $C_2F_4/C_3H_6$ said elastomers containing peroxidic cure sites.

4. Cured fluoroelastomeric compositions according to claim 1, wherein the elastomer is a blend of a fluoroelastomer based on $CH_2=CF_2$ and of an elastomeric $C_2F_4/C_3F_6$ copolymer.

5. Fluoroelastomeric compositions curable with peroxides or with mixed peroxidic and ionic curing systems, endowed with improved processability properties, comprising (a) a fluoroelastomer containing peroxide cure sites and (b) additives in amounts within the range of from 0.5 to 10 parts by weight per 100 parts by weight of fluoroelastomer, said additives having the general formula:

$$R-[(CH_2CF_2)_n-(C_3F_6)_m-(C_2F_4)_p-(C_2F_3Cl)_q]-X \quad (I)$$

wherein
X is either Br or I; the units with n, m, p, q indices are randomly distributed along the chain, R is a linear or branched $C_1-C_{20}$ alkyl radical, which can also contain halogen atoms or ester or ether groups, and wherein:
n = integer of from 1 to 30;
m = integer of from 0 to 10;
p and q are integers within the range of from 0 to 20, said additive having an average molecular weight within the range of from 600 to 2,500.

* * * * *